(12) United States Patent
Wriggle et al.

(10) Patent No.: US 11,280,462 B1
(45) Date of Patent: Mar. 22, 2022

(54) SAFETY SIGN HAVING A SAFETY SWITCH WITH AN INTEGRATED LIGHT

(71) Applicants: Steve Wriggle, Schertz, TX (US); Dorothy J. Wriggle, Alvin, TX (US)

(72) Inventors: Steve Wriggle, Schertz, TX (US); Dorothy J. Wriggle, Alvin, TX (US)

(*) Notice: Subject to any disclaimer, the term of this patent is extended or adjusted under 35 U.S.C. 154(b) by 0 days.

(21) Appl. No.: 17/481,690

(22) Filed: Sep. 22, 2021

Related U.S. Application Data

(62) Division of application No. 17/344,137, filed on Jun. 10, 2021, now Pat. No. 11,143,372.

(51) Int. Cl.
| | |
|---|---|
| *G09F 13/22* | (2006.01) |
| *F21S 9/02* | (2006.01) |
| *H01H 13/52* | (2006.01) |
| *F21V 23/02* | (2006.01) |
| *F21V 8/00* | (2006.01) |
| *A47B 96/00* | (2006.01) |
| *F21V 3/06* | (2018.01) |
| *A47B 81/00* | (2006.01) |
| *F21W 111/00* | (2006.01) |

(52) U.S. Cl.
CPC ............. *F21S 9/022* (2013.01); *A47B 81/00* (2013.01); *A47B 96/00* (2013.01); *F21V 3/062* (2018.02); *F21V 23/02* (2013.01); *G02B 6/006* (2013.01); *G09F 13/22* (2013.01); *H01H 13/52* (2013.01); *F21W 2111/00* (2013.01)

(58) Field of Classification Search
CPC .......... F21S 9/022; A47B 81/00; A47B 96/00; G02B 6/006; G09F 2013/185; H01H 13/52
See application file for complete search history.

(56) References Cited

U.S. PATENT DOCUMENTS

| | | | | |
|---|---|---|---|---|
| 3,610,860 | A * | 10/1971 | Baldwin | H01H 23/164 200/315 |
| 5,376,314 | A * | 12/1994 | Share | H01H 9/182 264/132 |
| 2007/0096663 | A1* | 5/2007 | Wong | H05B 45/00 315/312 |
| 2008/0105523 | A1* | 5/2008 | Birdwell | H01H 13/04 200/296 |
| 2008/0295371 | A1* | 12/2008 | Hsu | G09F 13/06 40/570 |
| 2010/0139638 | A1* | 6/2010 | Hargrave | F24C 15/04 126/19 R |

(Continued)

*Primary Examiner* — Gary C Hoge
(74) *Attorney, Agent, or Firm* — Donald J. Ersler

(57) ABSTRACT

A safety device cabinet includes an equipment cabinet, a safety switch having an integrated light, a switch logic circuit and a battery back-up. The safety device cabinet includes an equipment cabinet and an access door. The access door includes a window and an edge light emitting device. The window is etched with a message containing a description of the equipment stored in the equipment cabinet. The safety switch with an integrated light includes a push momentary switch, a light bezel and a bezel light source. An inner perimeter of the outer shell is sized to receive a push button of the push momentary switch. The light bezel preferably includes an opening to receive a light emitting portion of the light source. The switch logic circuit preferably includes a AC to DC converter, a microprocessor, a software program and a monitoring device.

9 Claims, 5 Drawing Sheets

(56) References Cited

U.S. PATENT DOCUMENTS

| | | | |
|---|---|---|---|
| 2015/0170850 A1* | 6/2015 | Kirita | H01H 13/023 |
| | | | 200/314 |
| 2015/0337788 A1* | 11/2015 | Sago | H01Q 1/3291 |
| | | | 123/179.1 |
| 2016/0049053 A1* | 2/2016 | Simmons | G08B 7/066 |
| | | | 340/815.4 |
| 2019/0035312 A1* | 1/2019 | Killion | G02B 6/006 |

* cited by examiner

SAFETY SIGN HAVING A SAFETY SWITCH WITH AN INTEGRATED LIGHT

CROSS-REFERENCES TO RELATED APPLICATIONS

This is a divisional patent application, which takes priority from patent application Ser. No. 17/344,137, filed on Jun. 10, 2021.

BACKGROUND OF THE INVENTION

Field of the Invention

The present invention relates generally to building safety and more specifically to a safety sign having a safety switch with an integrated light.

Discussion of the Prior Art

Emergency lighting, such as Exit signs have been mandated for one hundred years (1911), since the New York Triangle Shirtwaist factory fire that killed 146 people, mostly women and children. The National Fire Protection Association (NFPA) is an organization that institutes codes and standards applicable to national, state, and local laws. The NFPA has required that all EXIT signs be lit all the time since 1911 and emergency lighting fixtures be lit during AC power failures. During this one-hundred-year period, the lighting required to support emergency lighting fixtures includes EXIT signs and other ancillary emergency lighting. The EXIT signs over the last one hundred years have transitioned from incandescent, compact fluorescent, and eventually to the light-emitting diode (LED), which was developed in 1962. The first LED EXIT sign and other emergency lighting fixtures were developed and patented in 1984. It was also during all these advancement periods that the lit momentary pushbutton switches using incandescent, compact fluorescent and LED lighting usually as a lit button existed. It is important to note that in the year of 1974, the predominant lighting effect was achieved by incandescent lighting for both emergency lighting and lit momentary switches.

In 1974, the (NFPA) mandated/required by code/law that all emergency lighting fixtures be complimented with a secondary power source using a battery backup system. The NFPA standard/code developed in 1974 requiring battery backup systems for emergency lighting fixtures, also became law. There was also the requirement, to test and inspect the emergency lighting fixtures ensuring the battery backup system was operating and functional. In current and past art, this was achieved by having two independent elements to include a small red light, and a separate manual push to test momentary switch. The momentary switch used is designed to break/interrupt the AC power circuitry powering the lighting fixture. Testing ensures that the battery backup power supply provides power for the emergency lighting fixture during a specified time-period of 90 minutes. If the action previously described did not transpire or yield proper effects, the emergency lighting fixture was deemed inoperable and needed to be replaced or repaired. During the past 47-year period, manufacturers and commercialized emergency lighting fixtures have standardly utilized a small incandescent, fluorescent, and now a 5 mm lit LED. The purpose of this light is to indicate alternating current (AC) power, is active/live and providing power to the emergency lighting fixture as the primary power source, and not the battery backup system. In addition to the separate and independent lit AC power light indicator used on past and current art emergency lighting fixtures, is a separate and stand-alone momentary manual push button used to achieve the required testing and visual inspection for battery backup systems. Patent publication no. 2008/0276509 to Yu discloses a door with built-in exit signal.

There is also a need in the art to provide an equipment cabinet having an access door with an illuminated message describing the safety equipment contained in the cabinet. The illuminated message would appear in etching in a window of the access door. There would be an emergency battery to back-up the light emitting device for illuminating the message in the door. In the event that the equipment cabinet houses a fire extinguisher, it is preferable that windows in the doors also be marked with a graphic image and a color code for illustrating the type of fire that the extinguisher may be used on. Patent publication no. 2010/0139638 to Hargrave et al. U.S. Pat. No. 8,723,683 to Crossman et al. discloses an illuminated fire extinguisher cabinet. Patent publication no. 2016/0312524 to Dai et al. discloses a door with built-in exit signal.

Accordingly, there is a clearly felt need in the art for a momentary or latched switch (safety switch with integrated light) that replaces the test push switch and a light displaying the AC voltage. The AC voltage supplies current to a light emitting device for an EXIT sign or an edge lighting device window in an access door. A supply of AC voltage is evidenced by the integrated light shown on the safety switch. The safety switch with integrated light has the following advantages: manufacturing is more efficient with a single element; manufacturing is less expensive; reduces vandalism by omitting protruding buttons; requires less labor during test procedures; and provides easier user interface during test procedures and inspection; and notifications during failures. The equipment cabinet would include an access door with an illuminated window displaying the type of equipment housed in the equipment cabinet with a message and the safety switch with illuminated light for testing a back-up battery for the illuminated message.

SUMMARY OF THE INVENTION

The present invention provides safety device cabinet with a safety switch having an integrated light. The safety device cabinet includes an equipment cabinet, the safety switch having an integrated light, a switch logic circuit, a battery back-up. The safety device cabinet includes an equipment cabinet and an access door. The access door includes a window and an edge light emitting device. The window is etched with a message containing a description of the equipment stored in the equipment cabinet. The window may be fabricated from glass, plastic or any other suitable material. The edge light emitting device will emit light into the edge of the window and the etched message will be illuminated. It is preferable to have an etched description applied to the window with an image of the type of fire that the extinguisher is appropriate for extinguishing; and/or instructions for use such as "Pull, Aim, Squeeze, and Sweep". NFPA 10 requires such instructions, to include the type on fire extinguishers to be facing outward when hung or placed within a cabinet; however, during an incipient fire reading the small font takes time negating this first line of defense, giving this invention advantages. It is also preferable that the window also be identified with a color code that matches the type of fire that may be extinguished with the fire extinguisher.

It is the objective of this invention to identify within a building, other such cabinet features containing fire department connection (FDC) valves and fire hose cabinets. In the event of a fire, the fire personnel typically terminate the AC power to fire involved buildings or structures for safety reasons. With a fire emitting large quantities of smoke, locating such FDC's and fire hose cabinets can be made difficult. It is the objective of the etched and edge lit cabinet window, for example etched with "FDC Type I, II or III" in aqua or blue (representing the color of water) enabling firefighters to rapidly locate such cabinets to quickly expedite interior structure fire extinguishment.

The safety switch with an integrated light (lighted safety switch) includes a push momentary switch, a light bezel and a bezel light source. The push momentary switch is preferably normally open. The light bezel includes a red tinted clear plastic outer shell. An inner perimeter of the outer shell is sized to receive a push button of the push momentary switch. The push momentary switch includes the word, "test," which may or may not be illuminated with a light source. An outer perimeter of the outer shell is preferably threaded for retention in an opening formed through a sidewall of an enclosure. The bezel preferably includes an opening to receive a light emitting portion of the bezel light source. The bezel light source will shine light into the outer shell, which will illuminate the outer shell. The bezel light source is preferably an LED.

The switch logic circuit preferably includes an AC to DC converter, a microprocessor, a software program and a monitoring device. The AC to DC converter receives input from a building AC voltage line and outputs a low-level DC voltage. The DC voltage from the AC to DC converter is used to monitor the AC voltage of the building by the microprocessor. The bezel light source and the push light source are connected to an output of the microprocessor. Contacts of the push momentary switch are also connected to the microprocessor. The monitoring device is connected to a piece of safety equipment, when the monitoring device is removed, a signal is sent to the microprocessor that the normally closed or open connection is now opened/closed, which triggers a local alarm found within the fixture's enclosure. In addition, the preferable alarm activation includes a plunger type or magnet release when the door to the equipment cabinet has been opened to trigger the local enclosures alarm.

The software program monitors all the inputs of the microprocessor to see if there has been a change in status of any of the inputs. If there is no longer a voltage input from the AC to DC converter, the software will terminate the light source integrated into the lit testing switch. In addition, the software will instruct the integrated light switch to flash when system failures have been detected, i.e.: battery charging, lighting failure, battery failure, etc. The flashing voltage waveform could also be sent to the edge light emitting device, such that a flashing light is seen in the etching of the window of a safety device cabinet. If the push momentary switch is depressed, the microprocessor will cause a power switch or a relay to change a power source from building AC to a back-up battery for the emergency lighted sign or to the window of the safety equipment cabinet. Depressing the push momentary switch once will cause the back-up battery to be used for a set amount of time, such as 15 minutes. The software program includes logic for counting the number of times the push momentary switch is depressed to provide an increased length of time for testing the back-up battery. For example, two pushes is testing for 30 seconds and three pushes is testing for 90 minutes. The use of the back-up battery for some length of time tests the integrity of the back-up battery and other circuitry connections.

Accordingly, it is an object of the present invention to provide a safety switch with integrated light that replaces a test push switch and a light displaying AC voltage.

It is another object of the present invention to provide a safety switch with integrated light, which is less expensive to manufacture; reduces vandalism by omitting protruding buttons; requires less labor during test procedures; and provides easier user interface during test procedures; and notifications during failures. Most importantly the object of this invention is to enhance the visibility through a larger and brighter light source through the lit integrated switch to detect failures within emergency lighting fixtures.

Finally, it is another object of the present invention to provide a safety equipment cabinet, which includes an access door with an illuminated window displaying the type of equipment housed with a message and the safety switch with illuminated light for testing a back-up battery for the illuminated message.

These and additional objects, advantages, features and benefits of the present invention will become apparent from the following specification.

DETAILED DESCRIPTION OF THE PREFERRED EMBODIMENTS

Figure 1:
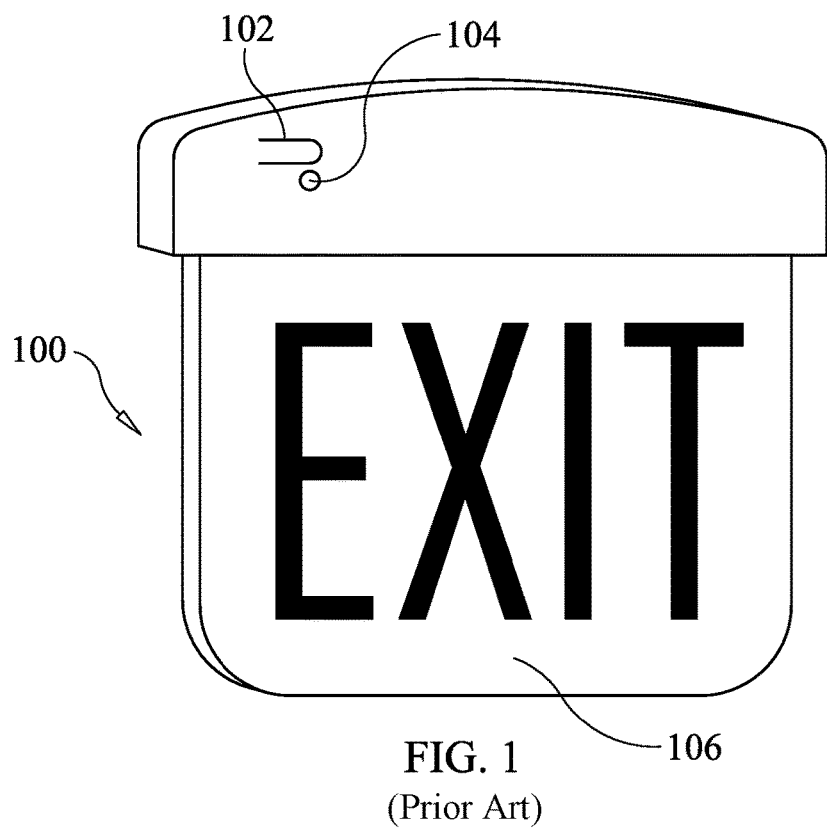
FIG. 1 is a perspective view of a prior art EXIT sign having a power indication light and a test switch.
Figure 2:
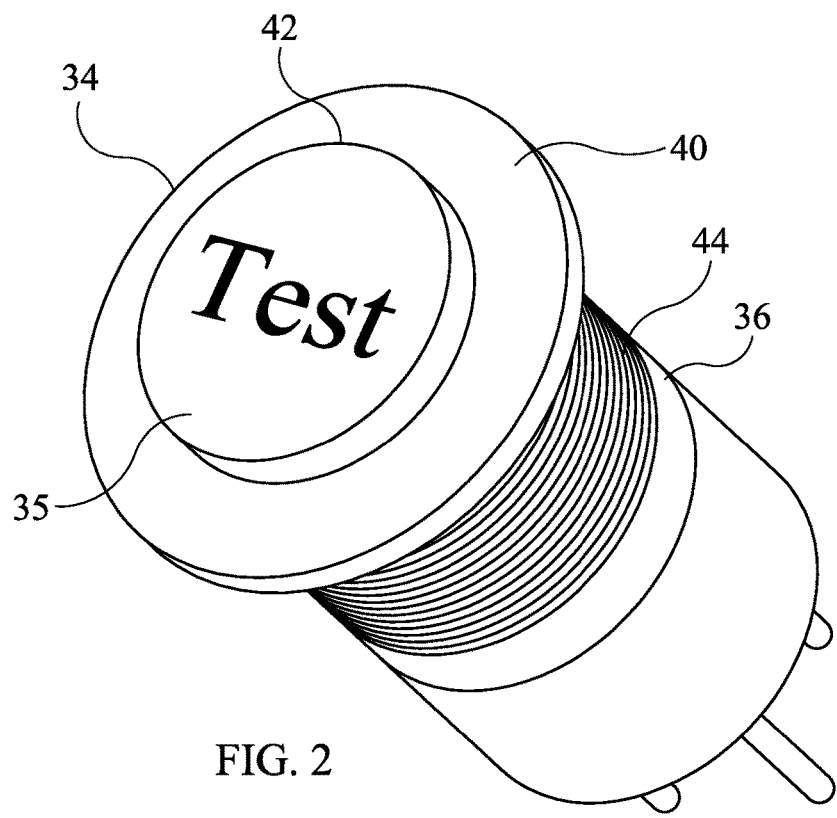
FIG. 2 is a perspective view of a safety switch having an integrated light in accordance with the present invention.
Figure 5:
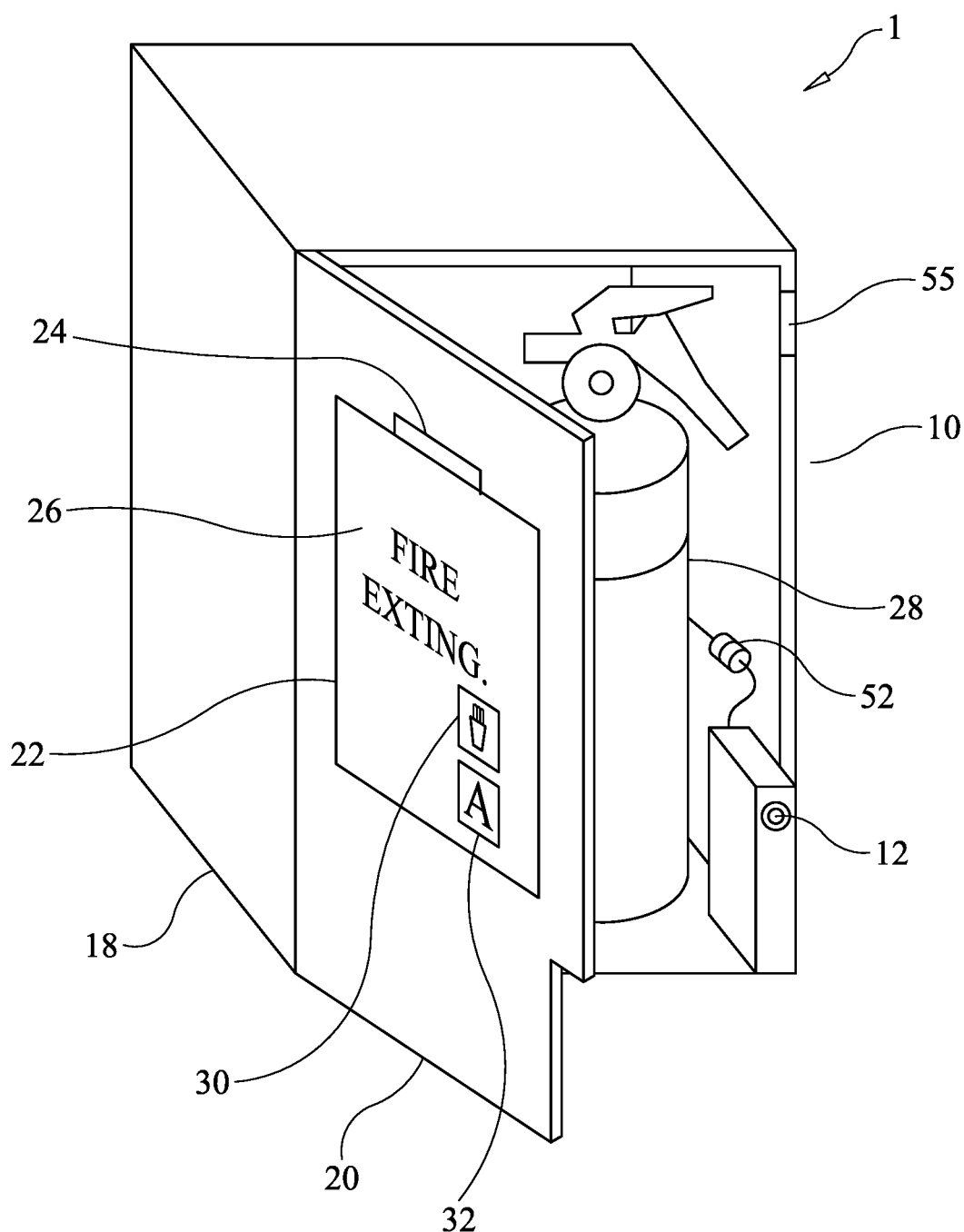
FIG. 5 is a perspective view of a safety equipment cabinet incorporating a safety switch having an integrated light in accordance with the present invention.
Figure 6:
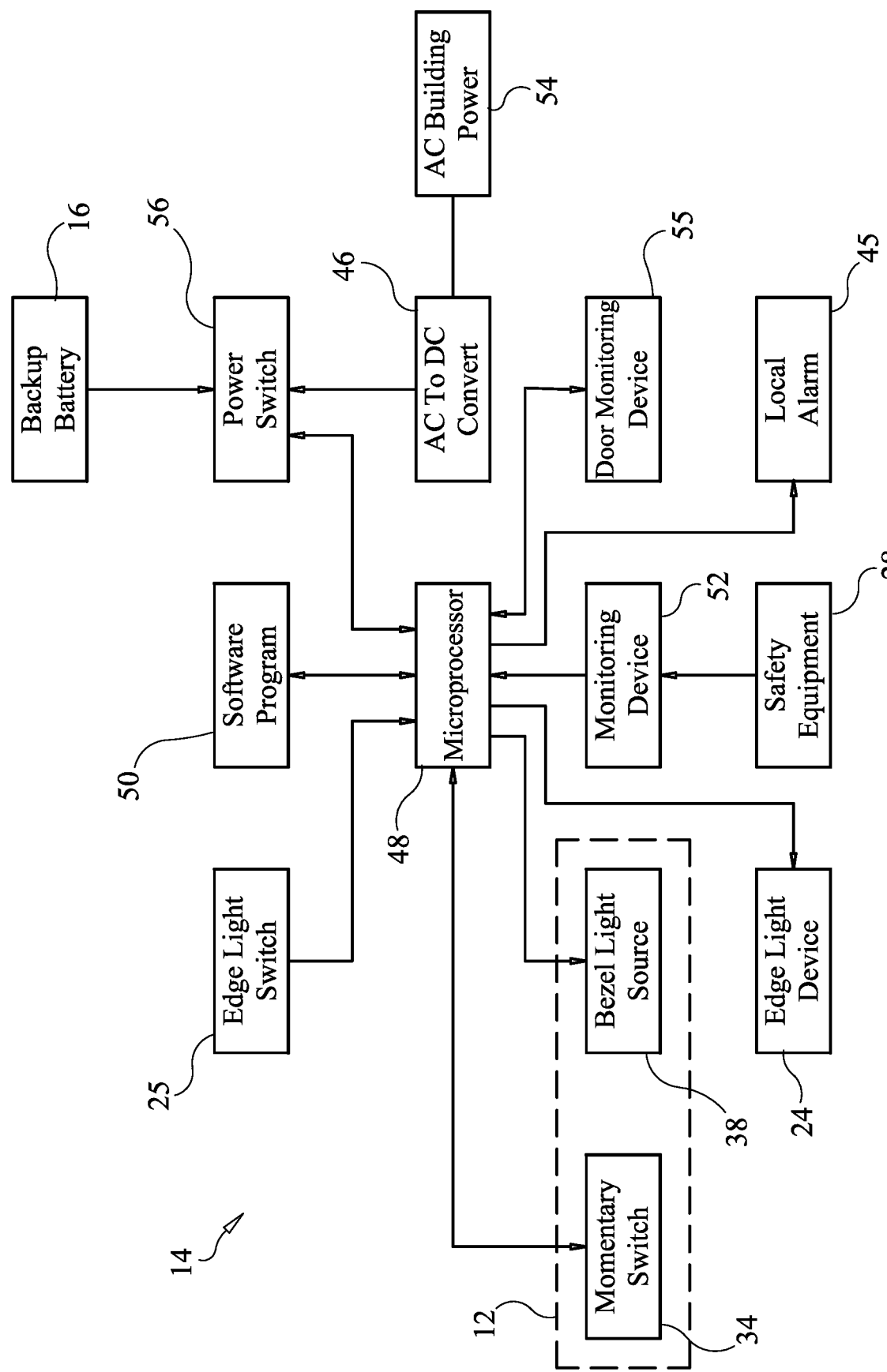
FIG. 6 is a schematic diagram of a safety equipment cabinet incorporating a safety switch having an integrated light in accordance with the present invention.

With reference now to the drawings, and particularly to FIG. 1, there is shown a prior art EXIT sign 100. The prior art exit sign includes a test button 102 and a power indicator light 104. The test button 102 switches electrical power supplied to lighted sign 106 from AC building voltage to a backup battery (not shown). The power indicator light 104 is illuminated as long as the lighted sign 106 is being supplied with power from the AC building voltage. With reference to FIGS. 2, 5 and 6, a safety device cabinet 1 includes an equipment cabinet 10, a safety switch having an integrated light 12, a switch logic circuit 14 and a battery back-up 16. The safety device cabinet 10 includes an equipment cabinet 18 and an access door 20. The access door 20 includes a window 22 and an edge light emitting device 24. The window 22 is etched with a message 26 containing a description of the equipment, such as a fire extinguisher 28 stored in the equipment cabinet 10. The window 22 may be fabricated from glass, plastic or any other suitable material. The edge light emitting device 24 will emit light into an edge of the window 22 and the etched message 26 will be illuminated. It is preferable to have an etched label on the window 22 with an image of the type of fire extinguisher, which is appropriate for extinguishing a particular type of fire; and/or instructions for use such as "Pull, Aim, Squeeze, and Sweep". It is preferable to have an option of always powering the edge light emitting device 24 with AC power and with the battery back-up 16, or only powering the edge light emitting device 24 with the battery back-up 16, if the AC power fails. The choice can be made through a switch 25. It is also preferable that the window 22 also be identified with a color code 32 that matches the type of fire that may be extinguished with the fire extinguisher 28.

Figure 3:
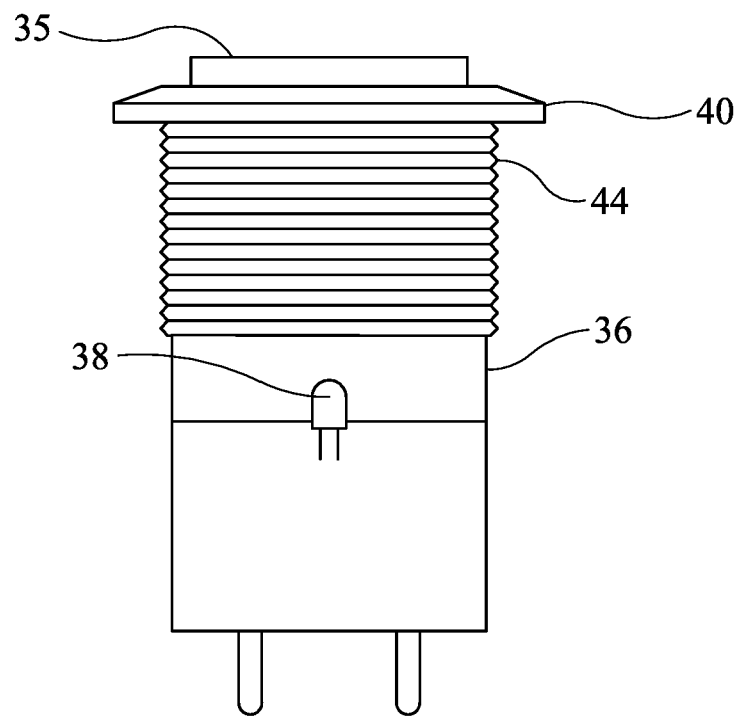
FIG. 3 is a side view of a safety switch having an integrated light in accordance with the present invention.

With reference to FIGS. 2-3, the safety switch with an integrated light (lighted safety switch) 12 includes a push momentary switch 34, a light bezel 36 and a bezel light source 38. The push momentary switch 34 is preferably normally electrically open. The push momentary switch 34 could also be a latching switch. The push momentary switch 34 includes the word, "Test," which is molded into a push button 35 of the push momentary switch 34. The word, "Test" may be illuminated with a push light source (not shown). Lighted push momentary switches are well known in the art and need not be explained in further detail. The light bezel 36 preferably includes a red tinted clear plastic outer shell and a retention flange 40. An inner perimeter 42 of the light bezel 36 is sized to receive an outer perimeter of the push button 35 of the momentary switch 34. An outer perimeter of the bezel 36 is preferably threaded 44 for retention in an opening formed through a sidewall of an electrical enclosure with a threaded nut. The bezel 36 preferably includes an opening to receive a light emitting portion of the bezel light source 38. The bezel light source 38 will shine light into the outer shell of the light bezel 38, which will illuminate the outer shell. The bezel light source 38 is preferably an LED.

With reference to FIG. 6, the switch logic circuit 14 preferably includes a AC to DC converter 46, a microprocessor 48, a software program 50 and a monitoring device 52. The AC to DC converter receives input from a building AC voltage line 54 and outputs a low-level DC voltage. The DC voltage from the AC to DC converter 46 is used to monitor the AC voltage 54 of the building by the microprocessor 48. The bezel light source 38 is connected to an output of the microprocessor 48. The push momentary switch 34 and the push light source are also connected to the microprocessor 48. The monitoring device 52 is connected to a piece of safety equipment, such as the fire extinguisher 28. When the safety equipment is removed from the equipment cabinet 10, a signal is sent to the microprocessor 48 that the normally closed/open connection is now open/closed, which triggers a local alarm 45 found within the equipment cabinet 10. In addition, the preferable alarm activation includes a plunger type or magnet release when the access door 20 has been opened to trigger the local enclosure alarm. However, a door monitoring device 55 may be substituted for the monitoring device 52 or used in conjunction therewith.

The software program 50 monitors all the inputs of the microprocessor 48 to see if there has been a change in status of any of the inputs. If there is no longer a voltage input from the AC to DC converter 46, the software program 50 will terminate the electrical power to the bezel light source 38. Additionally, the software program 50 will preferably instruct the safety switch having an integrated light 12 to flash when system failures have been detected. The flashing voltage waveform could also be sent to the edge light emitting device 24, such that a flashing light is seen in the etched message 26 in the window 22 of the safety device cabinet 10. If the push button 35 of the momentary switch 34 is depressed, the microprocessor 48 will cause a power switch 56 or a power relay to change a power source from building AC voltage 54 to the back-up battery 16 for the EXIT sign (safety sign) 60 or to the window 22 of the safety equipment cabinet 10. Depressing the push button 35 of the momentary switch 34 once will cause the back-up battery 16 to be used for a set amount of time, such 15 minutes. The software program 50 includes logic for counting the number of times the push button 35 is depressed to provide a different length of time for testing the back-up battery 16. The number of times the push button 35 is depressed determines the length of time that the back-up battery 16 is used. For example, two pushes is testing for 30 seconds and three pushes is testing for 45 minutes. The use of the back-up battery 16 for some length of time tests the integrity of the back-up battery 16.

Figure 4:
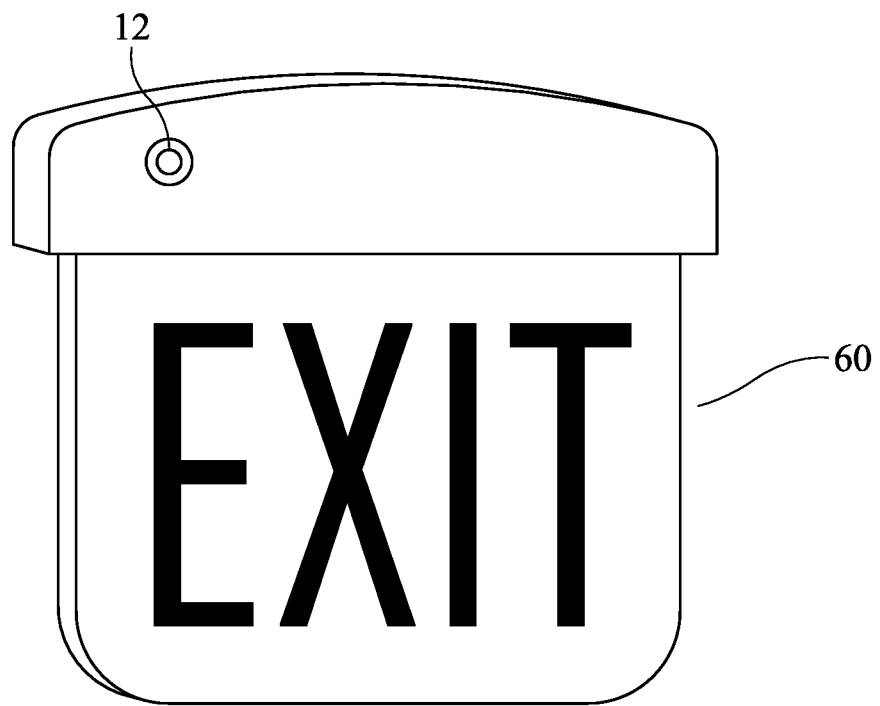
FIG. 4 is a perspective view of a safety sign incorporating a safety switch having an integrated light in accordance with the present invention.
Figure 7:
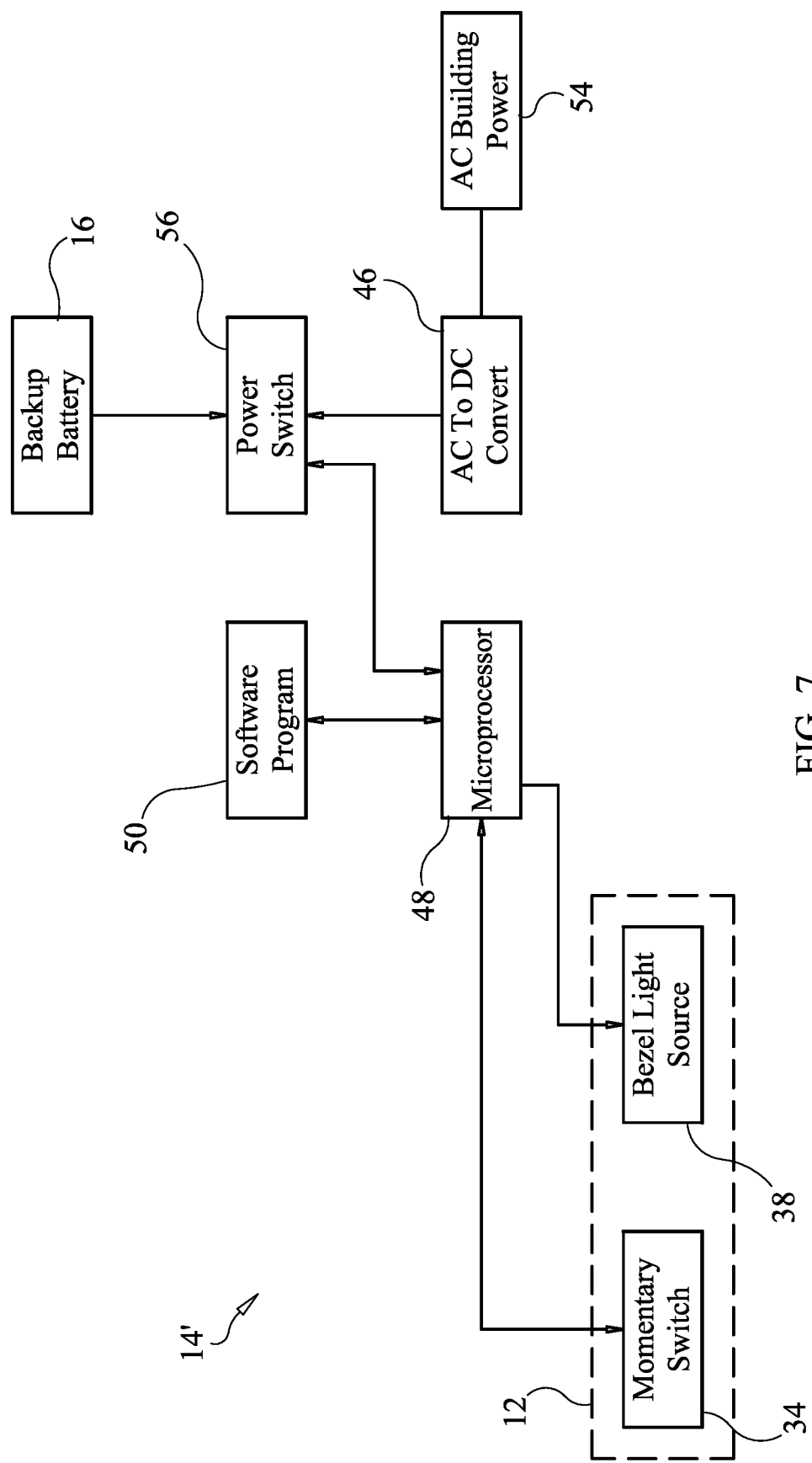
FIG. 7 is a schematic diagram of a safety sign incorporating a safety switch having an integrated light in accordance with the present invention.

With reference to FIGS. 4 and 7, an EXIT sign 60 includes a safety switch having an integrated light 12. The switch logic circuit 14' contained in the EXIT sign 60 receives input from a building AC voltage line 54 and outputs a low-level DC voltage. The DC voltage from the AC to DC converter 46 is used to monitor the AC voltage 54 of the building by the microprocessor 48. The light source 38 is connected to one of the outputs of the microprocessor 48. The push momentary switch 34 is also connected to the microprocessor 48. The software program 50 monitors all the inputs of the microprocessor 48 to see if there has been a change in status of any of the inputs. If there is no longer a voltage input from the AC to DC converter 46, the software program 50 will terminate electrical power to the bezel light source 38 such that no light is seen in the light bezel 36. If the push button 35 is depressed, the microprocessor 48 will cause the power switch 56 or power relay to change a power source from building AC voltage 54 to the back-up battery 16 for the EXIT sign 60. Depressing the push button 35 once will cause the back-up battery 16 to be used for a set amount of time, such 15 minutes. The use of the back-up battery 16 for some length of time tests the integrity of the back-up battery 16.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A safety sign having a safety switch with an integrated light, comprising:

a push momentary switch for making an electrical connection;

an AC to DC electrical circuit;

a back-up battery for powering the safety sign when an AC electrical power failure occurs; and a light bezel includes a color tinted clear plastic outer shell and a bezel light source, said AC to DC electrical circuit provides electrical current to power said bezel light source, said bezel light source illuminates said light bezel, an inner perimeter of said light bezel is sized to receive an outer perimeter of said push momentary switch, wherein said light bezel is retained in said safety sign instead of a non-light emitting switch and an AC indicator light, depressing said push momentary switch changes a source of power to said light bezel from AC voltage to said back-up battery.

2. The safety sign having a safety switch with an integrated light of claim 1, further comprising:
a switch logic circuit includes said AC to DC electrical circuit and a microprocessor, said AC to DC electrical circuit receives input from a building AC voltage line and outputs a low level DC voltage, the low level DC voltage is used to monitor the AC voltage of the building by said microprocessor, said bezel light source is connected to an output of said microprocessor, wherein said microprocessor stops supplying electrical power to said bezel light source when an AC electrical power failure occurs.

3. The safety sign having a safety switch with an integrated light of claim 2, further comprising:
a back-up battery for powering the safety sign and said microprocessor when the AC electrical power failure occurs.

4. The safety sign having a safety switch with an integrated light of claim 2 wherein:
said push momentary switch is connected to said microprocessor, depressing said push momentary switch causes said back-up battery to be tested.

5. The safety sign having a safety switch with an integrated light of claim 2, further comprising:
a software program contained in said microprocessor monitors at least one input of said microprocessor to see if there has been a change in status of said at least one input.

6. A safety sign having a safety switch with an integrated light, comprising:
a push momentary switch for making an electrical connection;
a microprocessor;
an AC to DC electrical circuit having a DC output connected to said microprocessor;
a back-up battery for powering the safety sign and said microprocessor when an AC electrical power failure occurs; and
a light bezel includes a color tinted clear plastic outer shell and a bezel light source, said AC to DC electrical circuit provides electrical current to power said bezel light source, said bezel light source illuminates said light bezel, an inner perimeter of said light bezel is sized to receive an outer perimeter of said push momentary switch, wherein said microprocessor sends electrical power to flash said light bezel when a voltage output from said AC to DC electrical circuit is not received by said microprocessor.

7. The safety sign having a safety switch with an integrated light of claim 6, further comprising:
a switch logic circuit includes said AC to DC electrical circuit and a microprocessor, said AC to DC electrical circuit receives input from a building AC voltage line and outputs a low-level DC voltage, the low-level DC voltage is used to monitor the AC voltage of the building by said microprocessor.

8. The safety sign having a safety switch with an integrated light of claim 7, further comprising:
a software program contained in said microprocessor monitors at least one input of said microprocessor to see if there has been a change in status of said at least one input.

9. A safety sign having a safety switch with an integrated light, comprising:
a microprocessor;
a back-up battery;
an AC to DC electrical circuit having a DC output connected to said microprocessor;
a push momentary switch is connected to said microprocessor, wherein depressing said push momentary switch causes said back-up battery to be tested;
a light bezel includes a color tinted clear plastic outer shell and a bezel light source, said AC to DC electrical circuit provides electrical current to power said bezel light source, said bezel light source illuminates said light bezel, an inner perimeter of said light bezel is sized to receive an outer perimeter of said push momentary switch, wherein said back-up battery is tested for different lengths of time according to the number of times said push momentary switch is depressed.

* * * * *